United States Patent [19]

Nottke

[11] 3,928,350

[45] Dec. 23, 1975

[54] PREPARATION OF 3-SUBSTITUTED 2-HYDROXYQUINOXALINES BY REACTION OF O-ARYLENEDIAMINES WITH TRIHALOVINYL EPOXIDES

[75] Inventor: James E. Nottke, Wilmington, Del.

[73] Assignee: E. I. Du Pont de Nemours and Company, Wilmington, Del.

[22] Filed: Aug. 27, 1973

[21] Appl. No.: 391,524

Related U.S. Application Data

[62] Division of Ser. No. 158,520, June 30, 1971, abandoned.

[52] U.S. Cl. ......... 260/250 Q; 260/348 R; 260/568; 260/309.2; 252/77
[51] Int. Cl.² .................................. C07D 241/36
[58] Field of Search ............................... 260/250 Q

[56] References Cited

OTHER PUBLICATIONS

Tkaczynski, "Chemical Abstracts," 1966, 64, 17594d.
Simpson, "The Chemistry of Heterocyclic Compounds," 1953, pp. 1020–1021, 235–240.

Primary Examiner—Donald G. Daus
Assistant Examiner—David E. Wheeler

[57] ABSTRACT

Described are a general process for making 3-substituted 2-hydroxyquinoxalines by reaction of o-arylenediamines with trihalovinyl epoxides and certain novel 2-hydroxy-3-perfluoroalkylquinoxalines made by the process.

7 Claims, No Drawings

PREPARATION OF 3-SUBSTITUTED 2-HYDROXYQUINOXALINES BY REACTION OF O-ARYLENEDIAMINES WITH TRIHALOVINYL EPOXIDES

CROSS-REFERENCE TO RELATED APPLICATION

This is a division of my copending application, Ser. No. 158,520, filed June 30, 1971 now abandoned.

BACKGROUND OF THE INVENTION

1. Field of the Invention

This invention relates to novel 2-hydroxy-3-perfluoroalkylquinoxalines and the preparation of these and other 3-substituted 2-hydroxyquinoxalines by reaction of o-arylenediamines with trihalovinyl epoxides.

2. Prior Art

2-Hydroxyquinoxalines and their tautomeric 2-oxo-1,2-dihydroquinoxalines are known to be obtainable by the reaction of o-phenylenediamines with α-oxo carboxylic acids, e.g., gloxylic and pyruvic acids. This specific reaction is one of a number of variations of the well-known Hinsberg reaction of o-diamines with 1,2-dicarbonyl compounds (Richter's) "Organic Chemistry", 12th Ed., Vol. IV, 1947, pp. 300–303; Karrer, "Organic Chemistry", 4th Ed., 1950, p. 459; Rodd, "Chemistry of Carbon Compounds", Vol. III-A (1954), pp. 225–226, and Vol. IV-B (1959), pp. 1345, 1346, 1355, 1356).

No 2-hydroxy-3-perfluoroalkylquinoxalines have been found in the literature. The reaction of o-arylenediamines with trihalovinyl epoxides has likewise not previously been reported.

DESCRIPTION OF THE INVENTION

Process of the Invention

3-Substituted 2-hydroxyquinoxalines, especially the 2-hydroxy-3-perfluoroalkylquinoxalines, are prepared by the reaction of o-arylenediamines with trihalovinyl epoxides. The reaction can be broadly represented as follows:

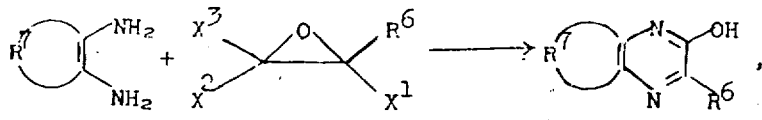

wherein $R^6$ may be hydrogen, fluorine, chlorine, lower perfluoroalkyl or phenyl; $R^7$ completes a carbocyclic aromatic nucleus of 6 to 10 carbons which may be substituted with one or more common substituents such as halogen, cyano, lower alkyl, lower alkoxy, carboxyl, lower alkoxycarbonyl, hydrocarbon aryl, or hydrocarbon aralkyl; and $X^1$, $X^2$, and $X^3$, individually, are fluorine or chlorine.

Details of the Process

The reaction of an o-arylenediamine with a trihalovinyl epoxide is readily accomplished by mixing the reactants in an inert solvent medium containing a non-nucleophilic base, at a temperature in the range from about −25° to about 120°C.

Conveniently, increments of the epoxide are added to a solution of the diamine and base in the solvent medium. The order and method of mixing the reactants are not, however, critical and can be arranged in any suitable fashion which allows for control of the reaction temperature within the above-stated range.

The proportions of the essential components of the reaction mixture are not critical. The diamine and epoxide reactants are ordinarily used in about equivalent proportions since no advantage is obtained by using either in excess. The specific role of the base is not known, and it has been found useful in any proportion within the range of about 0.1 to 10 moles per mole of diamine or epoxide. The amount of solvent medium used is dependent upon the temperature of reaction and the solubility of the diamine reactant, and is ordinarily at least a sufficient amount to completely dissolve the diamine at the lowest temperature employed.

Any commonly inert organic solvent which readily dissolves the diamine reactant may be used. Such solvents include aliphatic and aromatic hydrocarbons, halohydrocarbons, nitriles and ethers. Aliphatic ethers such as diethyl ether, glycol dimethyl ether, tetrahydrofuran and dioxane are preferred solvents.

o-Arylenediamines and trihalovinyl epoxides are generally operable in the process, the only qualification being that compatible substituents present in either reactant are preferably not competitively reactive with any component of the other. Formulas II and III given above for diamine and epoxide reactants represent reasonably accessible starting materials that can be used; and formula IV, representing the 2-hydroxyquinoxaline products, includes known compounds which have been obtained in other ways, e.g., by the Hinsberg reaction.

Representative Reactants and Products

In the following table, each horizontal entry shows representative o-arylenediamine and trihalovinyl epoxide reactants in the first two columns, and the corresponding 2-hydroxyquinoxaline products in the third column. All of the listed o-arylenediamines and trihalovinyl epoxides are known compounds.

TABLE

| o-Arylenediamine | Trihalovinyl Epoxide | 2-Hydroxyquinoxalines |
|---|---|---|
| A |  |  |
| 1. o-phenylenediamine | CF₂——CF—C₂F₅ perfluoro-1-butene epoxide | 2-hydroxy-3-pentafluoroethylquinoxaline |

TABLE-continued

| | o-Arylenediamine | Trihalovinyl Epoxide | 2-Hydroxyquinoxalines | |
|---|---|---|---|---|
| 2. | 2,3-diaminotoluene | perfluoro-1-octene epoxide | 2-hydroxy-8-methyl-3-tridecafluorohexyl-quinoxaline | + 2-hydroxy-5-methyl-3-tridecafluorohexyl-quinoxaline |
| 3. | 4,5-diamino-m-xylene | perfluoro-1-pentene epoxide | 2-hydroxy-3-heptafluoropropyl-6,8-dimethyl-quinoxaline | + 2-hydroxy-3-heptafluoropropyl-5,7-dimethyl-quinoxaline |
| 4. | o-diaminopseudocumene | hexafluoropropylene oxide | 2-hydroxy-3-trifluoromethyl-5,7,8-trimethyl-quinoxaline | + 2-hydroxy-3-trifluoromethyl-5,6,8-trimethylquinoxaline |
| 5. | 4-chloro-o-phenylenediamine | hexafluoropropylene oxide | 6-chloro-2-hydroxy-3-trifluoromethylquinoxaline | + 7-chloro-2-hydroxy-3-trifluoromethylquinoxaline |
| 6. | 3,5-dichloro-o-phenylenediamine | hexafluoropropylene oxide | 6,8-dichloro-2-hydroxy-3-trifluoromethylquinoxaline | + 5,7-dichloro-2-hydroxy-3-trifluoromethylquinoxaline |
| 7. | o-phenylenediamine | trichloroethylene oxide | 2-hydroxyquinoxaline | |
| 8. | ethyl 3,4-diaminobenzoate | tetrafluoroethylene oxide | ethyl 3-fluoro-2-hydroxyquinoxaline-7-carboxylate | + ethyl 3-fluoro-2-hydroxyquinoxaline-6-carboxylate |
| 9. | 4-ethoxy-1,2-diaminonaphthalene | tetrachloroethylene oxide | 3-chloro-6-ethoxy-2-hydroxybenzo[f]quinoxaline | + 2-chloro-6-ethoxy-3-hydroxybenzo[f]quinoxaline |
| 10. | 7-methoxy-1,2-diaminonaphthalene | trifluoroethylene oxide | 2-hydroxy-9-methoxybenzo[f]quinoxaline | + 3-hydroxy-9-methoxybenzo[f]quinoxaline |

TABLE-continued

| o-Arylenediamine | Trihalovinyl Epoxide | 2-Hydroxyquinoxalines | |
|---|---|---|---|
| 11. 2,3-diamino-4-methoxytoluene | chlorotrifluoroethylene oxide | 3-fluoro-2-hydroxy-5-methoxy-8-methylquinoxaline | + 3-fluoro-2-hydroxy-8-methoxy-5-methylquinoxaline |
| 12. 3,4-diaminobenzonitrile | trifluoroethylene oxide | 2-hydroxyquinoxaline-7-carbonitrile | + 2-hydroxyquinoxaline-6-carbonitrile |
| 13. 4-phenyl-o-phenylenediamine | perfluoro-1-hexene epoxide | 2-hydroxy-3-nonafluorobutyl-7-phenylquinoxaline | + 2-hydroxy-3-nonafluorobutyl-6-phenylquinoxaline |
| 14. 3,4-diaminotriphenylmethane | trichloroethylene oxide | 2-hydroxy-7-(diphenylmethyl)quinoxaline | + 2-hydroxy-6-(diphenylmethyl)quinoxaline |

EMBODIMENTS OF THE INVENTION

The following examples illustrate the process of the invention and describe specific new 2-hydroxy-3-perfluoroalkylquinoxalines.

EXAMPLE 1
2-Hydroxy-3-trifluoromethylquinoxaline

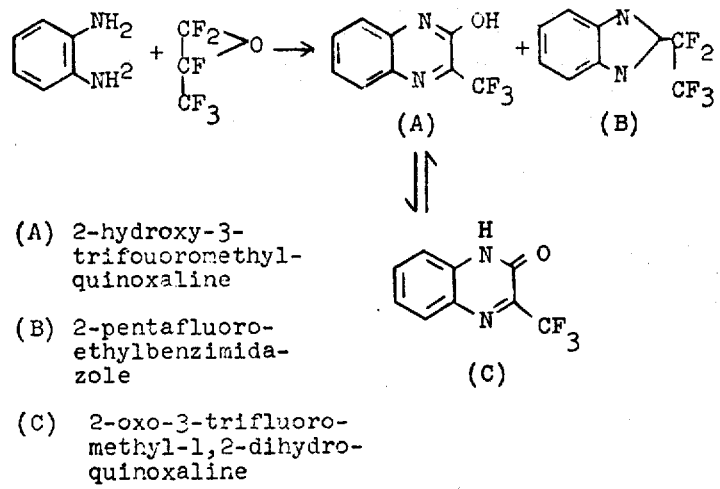

(A) 2-hydroxy-3-trifouoromethyl-quinoxaline (B) 2-pentafluoro-ethylbenzimidazole (C) 2-oxo-3-trifluoro-methyl-1,2-dihydro-quinoxaline Hexafluoropropylene oxide (19.2 g, 0.115 mole) was slowly bubbled into a stirred slurry of o-phenylenediamine (10.8 g, 0.10 mole) and potassium carbonate (5.0 g, 0.036 mole) in ehtyl ether (120 ml) maintained at −15°C. After addition was complete, the mixture was stirred at 20° for 18 hours, filtered, and the solid washed with ethyl ether. The combined filtrates were concentrated to give unchanged o-phenylenediamine (4.6 g, 42%) and 2-pentafluoroethylbenzimidazole (2.4 g, 10%). The solid from the filtration was extracted exhaustively with warm ethyl ether to give 2-hydroxy-3-trifluoromethylquinoxaline (4.7 g, 22%), m.p. 235°. Spectral data: uv (CF$_3$CN); 362 ($\epsilon$ 4640), 292 ($\epsilon$ 6290), sh 255 ($\epsilon$ 3380), 230 nm ($\epsilon$ 24,200). PMR (DMSO-d$_6$) 3.2–3.7 (broad singlet, 1H), 7.2–8.1 ppm (aryl mult, 4H).

FMR (DMSO); −68.8 ppm (singlet).

Anal. Calc'd. for C$_9$H$_5$F$_3$N$_2$O: C, 50.48; H, 2.35; F, 26.62; N, 13.08
Found: C, 49.56; H, 2.29; F, 26.03; N, 12.02

Notes:
(1) Similar results are obtained with tetrahydrofuran as solvent in place of ethyl ether.
(2) A and C are in tautomeric equilibrium.

EXAMPLE 2
2-Hydroxy-7-mehtyl-3-trifluoromethylquinoxaline

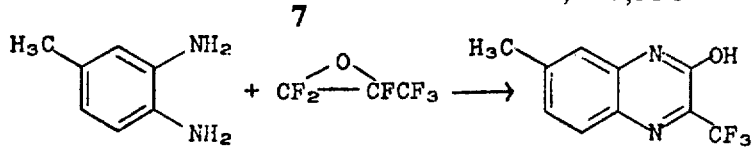

Into a slurry of 3,4-diaminotoluene (13.4 g, 0.11 mole), potassium carbonate (15.2 g, 0.11 mole), and tetrahydrofuran (150 ml) maintained at 10° was bubbled hexafluoropropylene oxide (19.7 g, 0.12 mole). After standing at 20° for 18 hrs., the mixture was filtered and the filtrate concentrated to a volume of 100 ml. Ether was added to give 6.0 g of gray crystals, m.p. 248° dec. Concentration of the mother liquor and addition of ether was repeated twice to give additional crops of 3.8 g and 2.2 g. Sublimation of the combined crude material at 150°/0.5 mm gave 10.8 g of off-white powder; m.p. 253°–4°, remelt 252°–4°.

Spectral Data

IR (KRr): 3000-2800, 1680, 1160, and 1060 cm$^{-1}$

PMR (DMSO-d$_6$): 2.43 (singlet, 3H), 7.1–7.9 ppm (mult., 3H)

FMR (acetone-d$_6$): −70.5 ppm (singlet)

UV (CH$_3$CN): 362 ($\epsilon$, 6000), 297 ($\epsilon$, 7170), 258 sh ($\epsilon$, 2320), 233 ($\epsilon$, 23,200)

Anal. Calc'd. for C$_{10}$H$_7$F$_3$N$_2$O: C, 52.64; H, 3.09; N, 12.28
Found: C, 51.65; H, 2.82; N, 12.35
51.97   2.89   12.21

Note:
(1) 3-Hydroxy-6-methyl-2-trifluoromethylquinoxaline can also be named (less usually) 2-hydroxy-7-methyl-3-trifluoromethylquinoxaline.

EXAMPLE 3

7-Chloro-2-hydroxy-3-trifluoromethylquinoxaline

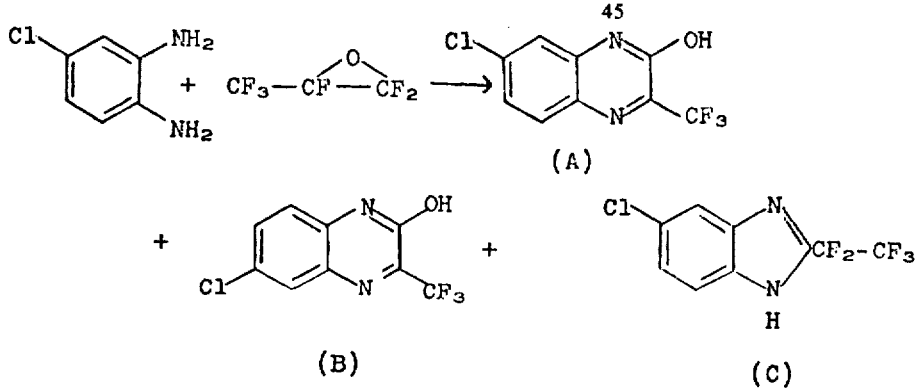

A. 7-chloro-2-hydroxy-3-trifluoromethylquinoxaline
B. 6-chloro-2-hydroxy-3-trifluoromethylquinoxaline
C. 5-chloro-2-pentafluoroethylbenzimidazole Over a period of one hour hexafluoropropylene oxide (19.5 g, 0.117 mole) was bubbled into a stirred slurry of 4-chloro-o-phenylenediamine (15.6 g, 0.11 mole) and potassium carbonate (13 g, 0.095 mole) in tetrahydrofuran (150 ml) maintained at 3.5 to 12°. After all of the hexafluoropropylene oxide had been added, the mixture was warmed to 25° and filtered. The filtrate was concentrated in vacuo and the residue crystallized from ether to give crude 7-chloro-2-hydroxy-3-trifluoromethylquinoxaline (9.8 g, 36%). This was sublimed at 150°/0.5 mm to give pure material (8.55 g, 31%), m.p. 252°–253°. Chromatography of the residue gave 5-chloro-2-pentafluoroethylbenzimidazole (5.0 g, 16.5%) and 6-chloro-2-hydroxy-3-trifluoromethylquinoxaline (0.4 g, 1.5%).

Anal. Calc'd. for C$_9$H$_4$F$_3$N$_2$OCl: C, 43.48; H, 1.62; F, 22.93; N, 11.26
Found: C, 43.49; H, 1.54; F, 23.61; 43.49   1.37
N, 11.14
11.04

EXAMPLE 4

2-Hydroxy-3-trifluoromethylbenzo[f]quinoxaline

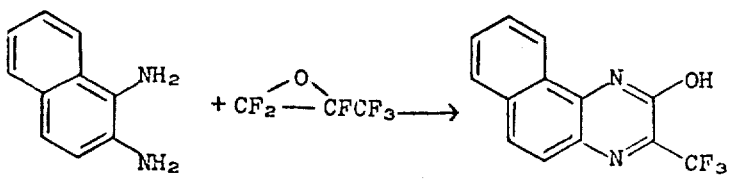

Hexafluoropropylene oxide (24 g, 0.14 mole) was slowly bubbled into a slurry of 1,2-diaminonaphthalene (22 g, 0.14 mole), potassium carbonate (9.5 g, 0.069 mole), and tetrahydrofuran (150 ml) at 25°–30°. After the addition was complete, the mixture was stirred for an additional 20 minutes, filtered, and the solid washed with tetrahydrofuran. The solid was heated to boiling in tetrahydrofuran (200 ml), filtered, and the filtrate cooled to give 2.5 g of product. A second crop of 0.9 g was obtained by concentrating the mother liquor from the first crop. The mother liquor from the second crop was combined with the filtrate of the crude reaction mixture. This was chromatographed over silica gel with ether-tetrahydrofuran to give 14.8 g of product. The product fractions were combined and recrystallized from tetrahydrofuran to give yellow needles, 19.4 g, 53%; m.p., 318°–22°.

Spectral Data

IR (KBr): 3000, 1680, 1630, 1520, 1180, 1135, and 1085 cm$^{-1}$
PMR (DMSO-d$_6$): 7.3–7.8 (aryl mult., 5H), 8.15–8.4 ppm (mult., 1H)
FMR (THF): −68.8 ppm (singlet).

| Anal. Calc'd. for $C_{13}H_7F_3N_2O$: | C, 59.10; | H, 2.67; | N, 10.60 |
|---|---|---|---|
| Found: | C, 58.67; | H, 3.17; | N, 10.40 |
| | 58.22 | 3.03 | 10.17 |
| | 58.36 | 2.99 | 10.24 |

EXAMPLE 5

2-Hydroxy-3-Trifluoromethylquinoxaline-6-carboxylic Acid

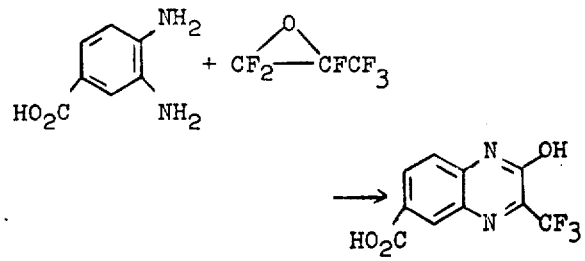

Hexafluoropropylene oxide (21.6 g, 0.13 mole) was bubbled into stirred slurry of 3,4-diaminobenzoic acid (18.2 g, 0.12 mole) and potassium carbonate (16 g, 0.12 mole) in tetrahydrofuran (250 ml) maintained below −5°. The mixture was stirred at 25° for one hour, filtered, and the solid washed with tetrahydrofuran. The combined filtrates were concentrated and extracted with ehtyl ether, leaving 10.93 g of tan solid. This was recrystallized from hot ehtyl ether containing a small amount of tetrahydrofuran to give 7.7 g of almost colorless crystals, m.p. 318°.

Spectral Data
IR (KBr): 3000–2700 (broad), 1670, 1600, 1400, 1270, 1140, 1050 cm$^{-1}$
PMR (DMSO-d$_6$): 1.61 (broad singlet, 1H), 3.48 (broad singlet, 1H), 7.29 (aryl multeplet, 1H), 8.10 ppm (aryl multiplet, 2H)
FMR (DMSO-d$_6$): −70.8 ppm (singlet)

| Anal. Calcd. for $C_{10}H_5F_3N_2O_3$: | C, 46.53; | H, 1.95; |
|---|---|---|
| | F, 22.08; | N, 10.85; |
| Found: | C, 48.03; | H, 2.57; |
| | F, 21.43; | N, 9.81; |
| | 22.01 | |
| | 21.65 | |

UTILITY

All of the products of formula IV are high boiling and have very high chemical and thermal stability in the molten state. They are therefore useful as heat-transfer media in corrosive atmospheres, e.g., as substitutes for Woods metal in oxidizing or acidic atmospheres which would attack Woods metal.

The use of 2-hydroxy-3-trifluoromethylquinoxaline (Example 1) as a bath material for a high-temperature bath is illustrated in:

EXAMPLE A

A 50-ml beaker containing 22 g of 2-hydroxy-3-trifluoromethylquinoxaline was heated with a mantle to 240°. The clear liquid remained unchanged for 20 minutes. Then a 10-ml flask containing 5.5 ml of tetraglyme (tetraethyleneglycol dimethyl ether; b.p. 252° C.) under a reflux condenser was lowered into the bath.

The bath was heated to 255° to maintain the tetraglyme at reflux for 30 minutes. The bath was cooled to room temperature and a sample removed, m.p. 235°–6° (unchanged from before heating).

It should be noted that bath material solid at room temperature is more convenient to handle than an oil. Furthermore, the present organic compounds are less dense than metals often used for high-temperature baths, thereby resulting in a lighter weight bath.

Since obvious modifications and equivalents will be evident to those skilled in the chemical arts, I propose to be bound solely by the appended claims.

The embodiments of the invention in which an exclusive property or privilege is claimed are defined as follows:

1. A process for preparing a 3-substituted 2-hydroxyquinoxaline which consists essentially of mixing
a trihalovinyl epoxide of the formula

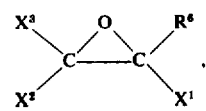

where R$^6$ is hydrogen, fluorine, chlorine, lower perfluoroalkyl or phenyl; and the X's, alike or different, are fluorine or chlorine; and
an o-arylenediamine of the formula

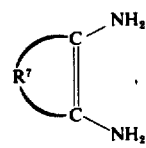

where R$^7$ is divalent and completes a carbocyclic aromatic nucleus of 6 or 10 carbons which may be substituted with 1 to 3 of halogen, cyano, lower n-alkyl, lower n-alkoxy, lower n-alkoxycarbonyl, carboxyl, phenyl or phenylalkyl in an inert solvent for the diamine having a non-nucleophilic base at a temperature in the range of −25° to 120°C.

2. The process of claim 1 in which the formula of the diamine is

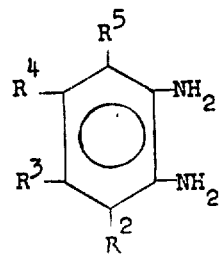

wherein R$^2$, R$^3$, R$^4$ and R$^5$, individually, may be hydrogen, lower n-alkyl, halogen or carboxyl; and R$^4$ and R$^5$, conjointly, may be divalent 1,4-butadienylene.

3. The process of claim 2 in which hexafluoropropylene oxide and o-phenylenediamine are reacted together.

4. The process of claim 2 in which hexafluoropropylene oxide and 3,4-diaminotoluene are reacted together.

5. The process of claim 2 in which hexafluoropropylene oxide and 4-chloro-o-phenylenediamine are reacted together.

6. The process of claim 2 in which hexafluoropropylene oxide and 1,2-diaminonaphthalene are reacted together.

7. The process of claim 2 in which hexafluoropropylene oxide and 3,4-diaminobenzoic acid are reacted together.

* * * * *